(12) United States Patent
Okubo et al.

(10) Patent No.: US 10,724,242 B2
(45) Date of Patent: Jul. 28, 2020

(54) METAL ROOFING MATERIAL AND ROOFING METHOD

(71) Applicant: Nisshin Steel Co. Ltd., Tokyo (JP)

(72) Inventors: Kenichi Okubo, Tokyo (JP); Motonori Kurotaki, Tokyo (JP); Shuichi Sugita, Tokyo (JP); Keiji Izumi, Tokyo (JP); Tomoyuki Nagatsu, Tokyo (JP); Yuugo Oota, Tokyo (JP); Katsunari Norita, Tokyo (JP); Keita Noguchi, Tokyo (JP); Norimasa Miura, Tokyo (JP)

(73) Assignee: Nisshin Steel Co., Ltd., Tokyo (JP)

( * ) Notice: Subject to any disclaimer, the term of this patent is extended or adjusted under 35 U.S.C. 154(b) by 0 days.

(21) Appl. No.: 15/764,192

(22) PCT Filed: Jul. 11, 2016

(86) PCT No.: PCT/JP2016/070456
§ 371 (c)(1),
(2) Date: Mar. 28, 2018

(87) PCT Pub. No.: WO2017/056630
PCT Pub. Date: Apr. 6, 2017

(65) Prior Publication Data
US 2019/0119917 A1    Apr. 25, 2019

(30) Foreign Application Priority Data

Oct. 2, 2015   (JP) ................. 2015-196857
Oct. 2, 2015   (JP) ................. 2015-196863
Mar. 15, 2016  (JP) ................. 2016-050848

(51) Int. Cl.
*E04D 1/18*    (2006.01)
*E04D 1/28*    (2006.01)
(Continued)

(52) U.S. Cl.
CPC ............. *E04D 1/18* (2013.01); *E04D 1/20* (2013.01); *E04D 1/24* (2013.01); *E04D 1/28* (2013.01);
(Continued)

(58) Field of Classification Search
CPC .... E04D 1/18; E04D 1/28; E04D 1/20; E04D 2001/3467; E04D 2001/3423;
(Continued)

(56) References Cited

U.S. PATENT DOCUMENTS 1,425,564 A * 8/1922 Whiteside ................. E04D 1/28
                                                     52/560
2,198,095 A * 4/1940 Sweedler ................ C08L 95/00
                                                     427/187
(Continued)

FOREIGN PATENT DOCUMENTS

DE    29500418 U1 *  4/1995  ............... E04D 1/28
EP    3269895        1/2018
(Continued)

OTHER PUBLICATIONS

English translation of the International Preliminary Report on Patentability for corresponding International application No. PCT/JP2016/070456, dated Apr. 12, 2018 (9 pages).
(Continued)

*Primary Examiner* — Christine T Cajilig
(74) *Attorney, Agent, or Firm* — Cook Alex Ltd.

(57) ABSTRACT

The present invention relates to a metal roofing material 1 that is arranged on an eave-side metal roofing material in an eave-ridge direction 6 of a roof so as to overlap the metal roofing material and the eave-side metal roofing material. The metal roofing material includes a front substrate 2 made of a metal sheet and including a body portion 20 formed in a box shape; a back substrate 3 arranged on the back side of
(Continued)

the front substrate 2 so as to cover an opening of the body portion 20; a core material 4 filled between the body portion 20 and the back substrate 3; and at least one plate reinforcing member 5 that is embedded in the core material 4 at a position closer to the back substrate 3 than a top plate of the body portion 20 or that is disposed in contact with the outer surface of the back substrate 3.

13 Claims, 17 Drawing Sheets

(51) Int. Cl.
E04D 1/24 (2006.01)
E04D 1/20 (2006.01)
E04D 1/34 (2006.01)
G01N 3/20 (2006.01)

(52) U.S. Cl.
CPC ....... *G01N 3/20* (2013.01); *E04D 2001/3423* (2013.01); *E04D 2001/3467* (2013.01)

(58) Field of Classification Search
CPC .......... E04D 2001/3494; E04F 13/0864; E04F 13/0866; E04F 13/0875
See application file for complete search history.

(56) References Cited

U.S. PATENT DOCUMENTS

| | | | | |
|---|---|---|---|---|
| 3,159,943 A | * | 12/1964 | Sugar | E04F 13/0864 174/2 |
| 3,943,676 A | * | 3/1976 | Ickes | E04C 2/044 52/309.12 |
| 4,187,650 A | * | 2/1980 | Poplin | E04D 1/28 52/288.1 |
| 2008/0127586 A1 | * | 6/2008 | Carolan | E04C 2/292 52/309.9 |

FOREIGN PATENT DOCUMENTS

| | | | | |
|---|---|---|---|---|
| FR | 927992 A | * | 11/1947 | ............... E04D 1/28 |
| FR | 2628179 | | 9/1989 | |
| JP | 49-000718 | | 1/1974 | |
| JP | S50-079128 | | 6/1975 | |
| JP | S57-119038 | | 7/1982 | |
| JP | S60-53543 | | 4/1985 | |
| JP | 63-064814 | | 4/1988 | |
| JP | H03-95416 | | 9/1991 | |
| JP | 05-005351 | | 1/1993 | |
| JP | 05-058724 | | 8/1993 | |
| JP | H05-248029 | | 9/1993 | |
| JP | 2006-083598 | | 3/2006 | |
| JP | 2007-239381 | | 9/2007 | |
| JP | 2010-138662 | | 6/2010 | |
| JP | 2015-040385 | | 3/2015 | |
| JP | 2015-071928 | | 4/2015 | |
| JP | 5864015 | | 2/2016 | |

OTHER PUBLICATIONS

International Search Report and Written Opinion, counterpart International Appl. No. PCT/JP2016/070456, dated Sep. 6, 2016, with English translation of the International Search Report (10 pages).

Japanese Office Action for corresponding Japanese application No. 2017-009485, with English-language translation, dated Dec. 12, 2019 (8 pages).

Chinese Office Action and Supplemental Search Report for corresponding Chinese application No. 201680057556.1, with English-language translation, issued Feb. 3, 2020 (12 pages).

\* cited by examiner

[FIG. 1]
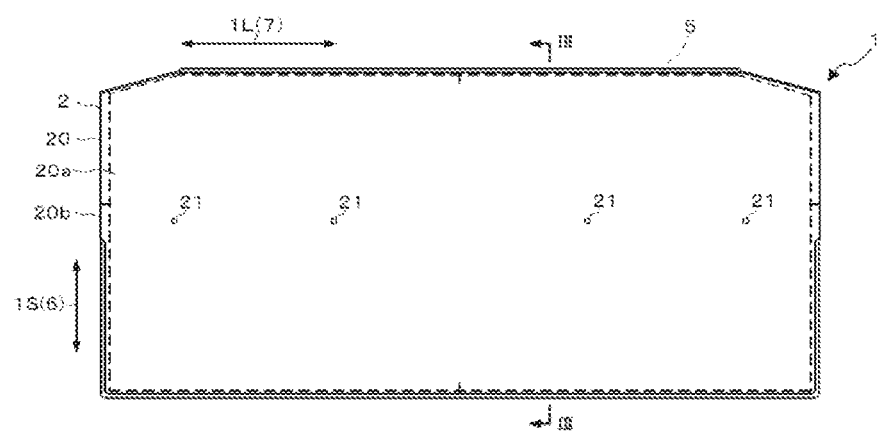

[FIG. 2]
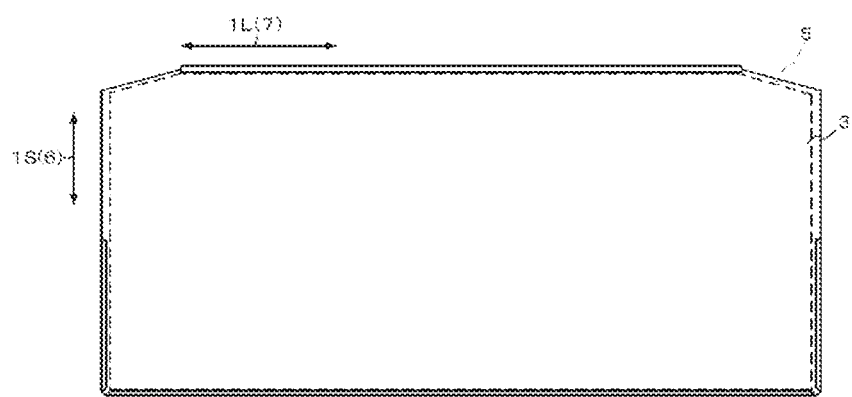

[FIG. 3]
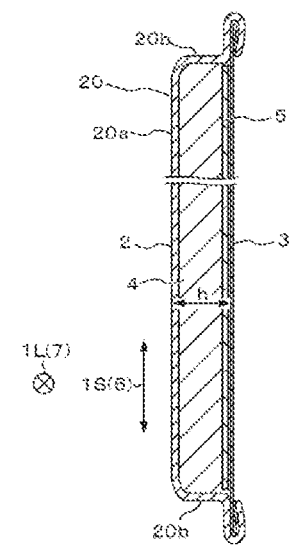

[FIG. 4]
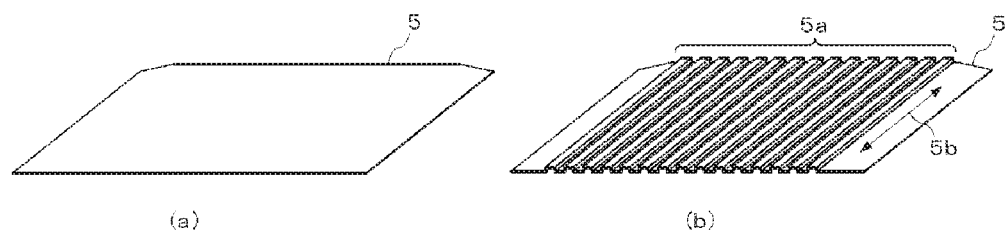

[FIG. 5]
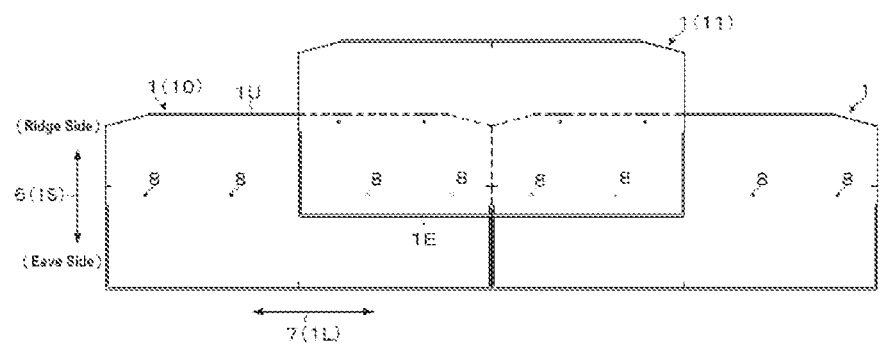

[FIG. 6]
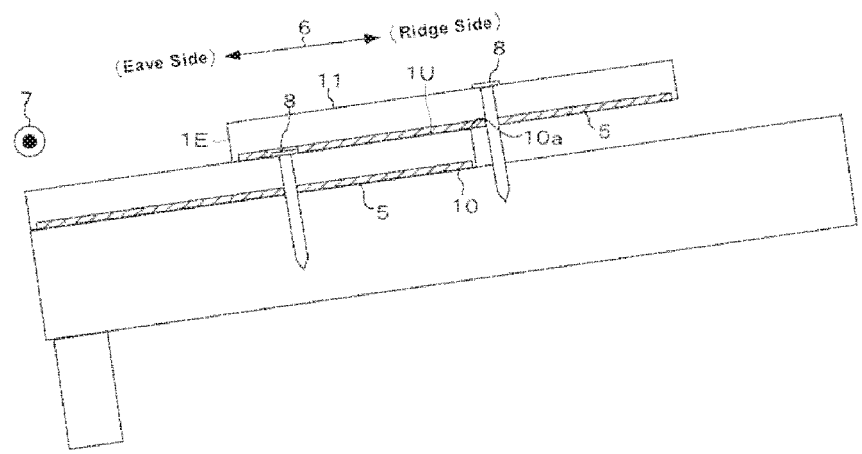

[FIG. 7]
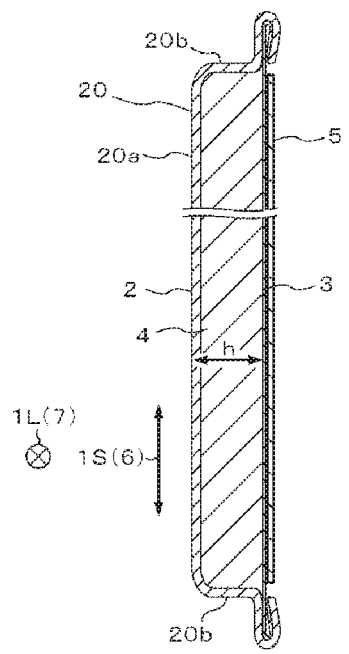

[FIG. 8]
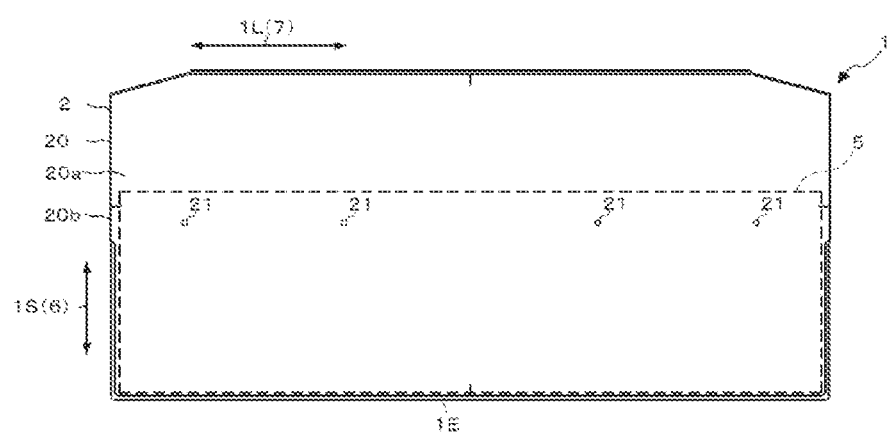

[FIG. 9]
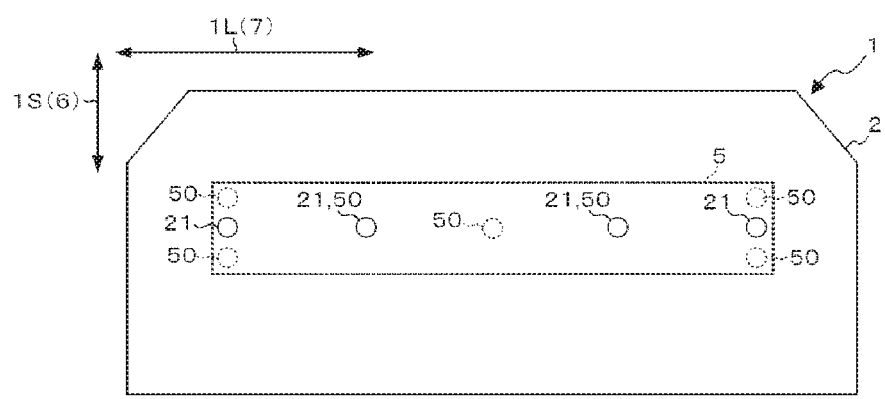

[FIG. 10]
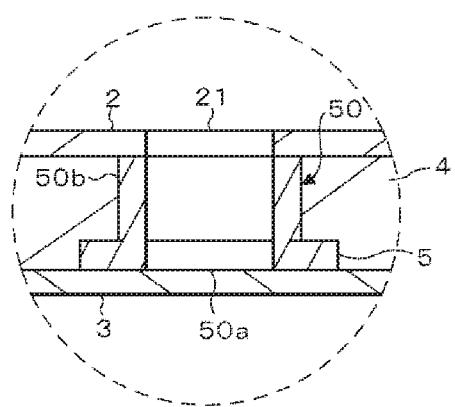

[FIG. 11]
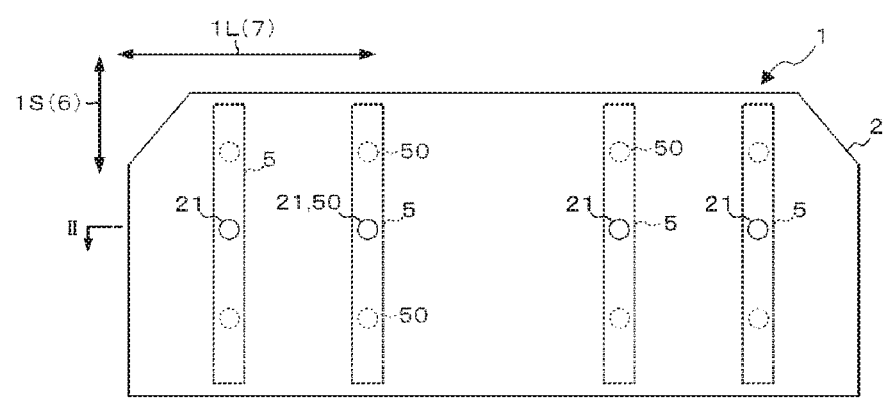

[FIG. 12]
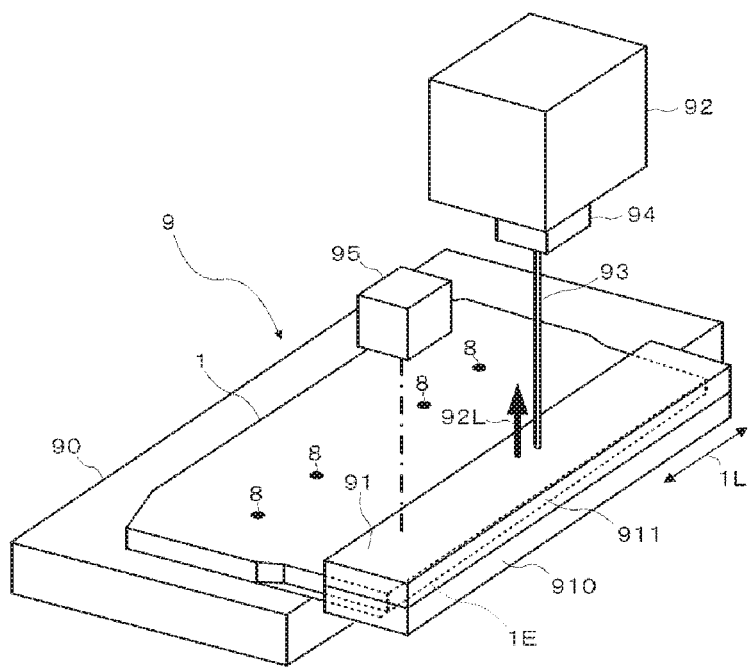

[FIG. 13]
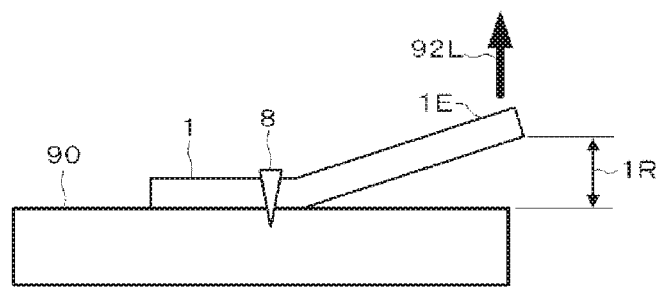

[FIG. 14]
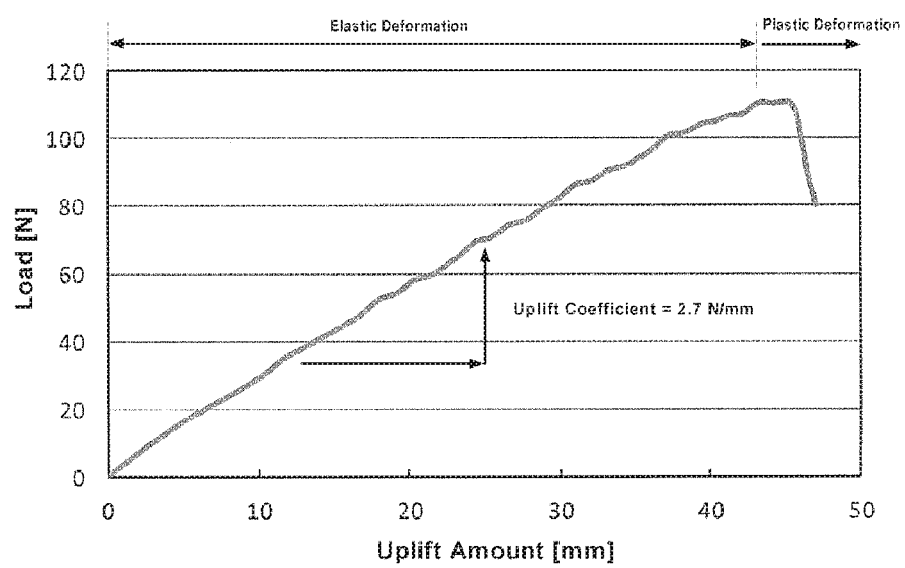

[FIG. 15]
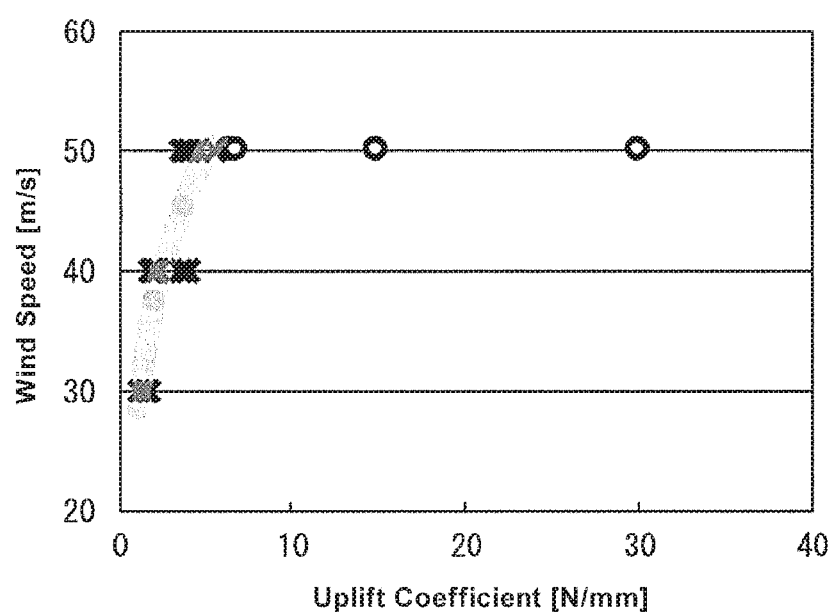

[FIG. 16]
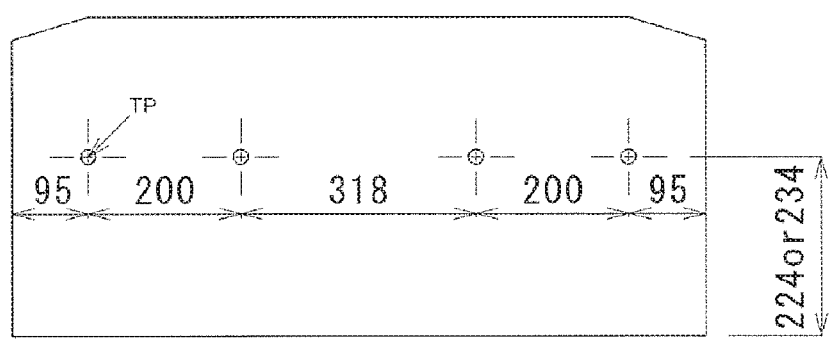

[FIG. 17]
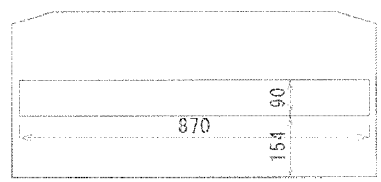
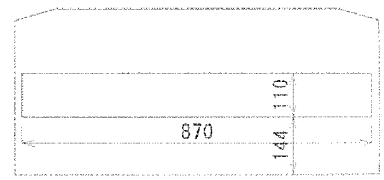
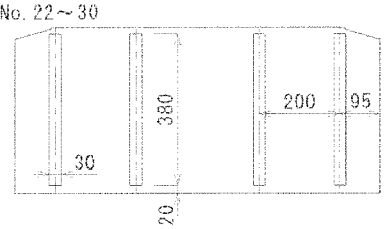

METAL ROOFING MATERIAL AND ROOFING METHOD

The present application is a U.S. National Stage of PCT International Patent Application No. PCT/JP2016/070456, filed Jul. 11, 2016, which claims priority to JP Application No. 2015-196857, filed Oct. 2, 2015, JP Application No. 2015-196863, filed Oct. 2, 2015 and JP Application No. 2016-050848, filed Mar. 15, 2016, all of which are hereby incorporated herein by reference.

TECHNICAL FIELD

The present invention relates to a metal roofing material that is arranged on an eave-side metal roofing material in an eave-ridge direction of a roof so as to overlap with the eave-side metal roofing material, and a roofing method.

BACKGROUND ART

The present inventors have attempted implementation of a metal roofing material as disclosed in the following Patent Document 1, i.e., a metal roofing material including a metal front substrate; a back substrate disposed on the back side of the front substrate; and a core material made of a foamed resin filled between the front substrate and the back substrate.

CITATION LIST

Patent Literature

Japanese Patent No. 5864015 B.

SUMMARY OF INVENTION

Technical Problem

The metal roofing material as described above uses a thin material such as an aluminum foil or an aluminum vapor-deposited paper for the back substrate. Therefore, the back side of the metal roofing material has lower strength and may result in insufficient wind pressure resistance performance over the entire metal roofing material.

The present invention has been made to solve the above problems. An object of the present invention is to provide a metal roofing material that can improve the wind pressure resistance performance.

Solution to Problem

The metal roofing material according to the present invention relates to a metal roofing material that is arranged on an eave-side metal roofing material in an eave-ridge direction of a roof so as to overlap the metal roofing material and the eave-side metal roofing material, the metal roofing material comprising: a front substrate made of a metal sheet and comprising a body portion formed in a box shape; a back substrate arranged on the back side of the front substrate so as to cover an opening of the body portion; a core material filled between the body portion and the back substrate; and at least one plate reinforcing member that is embedded in the core material at a position closer to the back substrate than a top plate of the body portion or that is disposed in contact with the outer surface of the back substrate.

The metal roofing material according to the present invention relates to a metal roofing material that is arranged on an eave-side metal roofing material in an eave-ridge direction of a roof so as to overlap the metal roofing material and the eave-side metal roofing material, the metal roofing material comprising: a front substrate made of a metal sheet and comprising a body portion formed in a box shape; a back substrate made of a metal sheet and arranged on the back side of the front substrate so as to cover an opening of the body portion; and a core material filled between the body portion and the back substrate, wherein the metal roofing material is configured to have an uplift coefficient of 6 N/mm or more when carrying out a strength test method of the metal roofing material comprising the steps of: tightening the metal roofing material to a base; applying a load for uplifting an end portion of the metal roofing material tightened to the base to the end portion; measuring an uplift amount of the end portion, which corresponds to the load; and determining an uplift coefficient represented by an amount of change of the load respective to an amount of change of the measured uplift amount.

Advantageous Effects of Invention

According to the metal roofing material and the roofing method of the present invention, the wind pressure resistance performance can be improved because at least one plate reinforcing member is embedded in the core material at the position closer to the back substrate than the top plate of the body portion or is disposed in contact with the outer surface of the back substrate, or because the back substrate is made of the metal sheet.

BRIEF DESCRIPTION OF DRAWINGS

FIG. 1 is a front view showing a metal roofing material according to an embodiment of the present invention.

FIG. 2 is a back view showing the metal roofing material 1 of FIG. 1.

FIG. 3 is a cross-sectional view of a metal roofing material taken along the line III-Ill in FIG. 1.

FIG. 4 is perspective views showing the plate reinforcing members of FIG. 1.

FIG. 5 is an explanatory view showing a roofing method using the metal roofing material of FIG. 1.

FIG. 6 is a side view showing two metal roofing materials that overlap with each other in FIG. 5.

FIG. 7 is an explanatory view showing a first variation of the metal roofing material of FIG. 1.

FIG. 8 is an explanatory view showing a second variation of the metal roofing material of FIG. 1.

FIG. 9 is an explanatory view showing a third variation of the metal roofing material of FIG. 1.

FIG. 10 is a cross-sectional view of the metal roofing material around the burring hole of FIG. 9.

FIG. 11 is an explanatory view showing a fourth variation of the metal roofing material of FIG. 1.

FIG. 12 is a perspective view showing strength test equipment for carrying out a strength test of the metal roofing material of FIG. 1.

FIG. 13 is an explanatory view showing an uplifted state of an end portion on the eave side of the metal roofing material of FIG. 5.

FIG. 14 is a graph showing an example of an uplift amount of the end portion versus a load measured by the strength test equipment of FIG. 13.

FIG. 15 is a graph showing a relationship between the uplift coefficient of FIG. 14 and a wind speed of wind blowing on a metal roofing material.

FIG. 16 is an explanatory view showing tightening positions of a metal roofing material experimentally produced when testing the relationship of FIG. 15.

FIG. 17 is an explanatory view showing modes of reinforcing members for a metal roofing material experimentally produced when testing the relationship of FIG. 15.

DESCRIPTION OF EMBODIMENTS

Embodiments for carrying out the present invention will be described with reference to the drawings.

Embodiments for Carrying Out the Present Invention

FIG. 1 is a front view showing a metal roofing material 1 according to an embodiment of the present invention, FIG. 2 is a back view showing the metal roofing material 1 of FIG. 1, FIG. 3 is a cross-sectional view of the metal roofing material 1 taken along a line III-III in FIG. 1, and FIG. 4 is a perspective view showing the plate reinforcing member 5 of FIG. 1.

The metal roofing material 1 shown in FIGS. 1 to 3 is a member that has a generally rectangular shape as viewed in the plan and has a short direction 1S (depth direction) and a longitudinal direction 1L (width direction). For example, the metal roofing material 1 is arranged on a roof base in a roof of a house or the like. As will be described below with reference to the figures, the metal roofing material 1 is arranged on the roof base such that the short direction 1S is along an eave-ridge direction 6 of the roof and the longitudinal direction L1 is along an eave direction 7 orthogonal to the eave-ridge direction 6 (a direction parallel to the eave) (see FIG. 5). As shown in FIGS. 1 to 3, the metal roofing material 1 includes a front substrate 2, a back substrate 3, a core material 4, and a plurality of plate reinforcing members 5.

<Regarding Front Substrate>
The front substrate 2 is a metal member that is made of a metal sheet and that appears on the outer surface of the roof when the metal roofing material 1 is placed on the roof base. As can be particularly seen from FIG. 3, the front substrate 2 is provided with a box-shaped body portion 20 including a top plate 20a and peripheral walls 20b.

The metal sheet making up the front substrate 2 that can be used includes a hot-dip Zn series plated steel sheet, a hot-dip Al plated steel sheet, a hot-dip Zn series plated stainless steel sheet, a hot-dip Al plated stainless steel sheet, a stainless steel sheet, an Al sheet, a Ti sheet, a coated hot-dip Zn series plated steel sheet, a coated hot-dip Al plated steel sheet, a coated hot-dip Zn series plated stainless steel sheet, a coated hot-dip Al plated stainless steel sheet, a coated stainless steel sheet, a coated Al sheet or a coated Ti sheet. When the front substrate 2 is formed into a box shape, the front member 2 may be preferably formed by means of drawing processing of the steel sheet, because the drawing processing of the steel sheet results in work hardening in the peripheral wall 20b, so that the wind pressure resistance performance of the metal roofing material 1 can be improved, and the peripheral wall 20b can be a wall surface continuous in the circumferential direction of the front substrate 2.

The front substrate 2 is provided with a plurality of tightening holes 21 spaced apart from one another in the longitudinal direction 1L of the metal roofing material 1. The tightening holes 21 indicate driving positions of tightening members 8 (see FIG. 6) into the metal roofing material 1.

Each tightening member 8 may be made of, for example, a screw, a nail or the like, and is used to tighten the metal roofing material 1 to the roof base. Although the embodiment is described in such a manner that the tightening holes 21 are provided on the front substrate 2, non-opening type marks indicating tightening positions of the tightening members, such as printed symbols and irregularities, may be provided in place of the tightening holes 21, on the surface of the front substrate 2.

<Regarding Back Substrate>
The back substrate 3 is arranged on the back side of the front substrate 2 so as to covert an opening of the body portion 20. The opening of the body portion 20 is bordered with inner edges of end portions on the side opposite to the top plate of the peripheral walls 20b of the body portion 20. The back substrate 3 that can be used include lightweight materials such as aluminum foil, aluminum vapor deposited paper, aluminum hydroxide paper, calcium carbonate paper, resin films or glass fiber paper and the like. The use of these lightweight materials for the back substrate 3 allows prevention of an increase in the weight of the metal roofing material 1.

<Regarding Core Material>
The core material 4 is made of, for example a foamed resin or the like, and is filled between the body portion 20 and the back substrate 3. The material of the core material 12 includes, but not limited to, for example, urethane, phenol and cyanurate resins. For roofing materials, however, certified noncombustible materials must be used. The test for certification of noncombustible material is conducted by a heat release test according to the cone calorimeter test method defined in ISO 5660-1. If the foamed resin for forming the core material 4 is urethane having a higher calorific value, the thickness of the core material 4 may be decreased, or inorganic expandable particles may be incorporated into the foamed resin. The filling of the foamed resin between the body portion 20 and the back substrate 3 can lead to a stronger adhesion of the core material 4 to the back surface of the front substrate 2 as compared with an embodiment where a backing material such as a resin sheet or the like is attached onto the back side of the front substrate 2, so that the performance required for the roofing materials, such as rainfall noise reduction, heat insulation and tread-down properties, can be improved.

<Regarding Plate Reinforcing Member>
At least one plate reinforcing member 5 is a sheet body embedded in the core material 4 at a position closer to the back substrate 3 than the top plate 20a of the body portion 20. The back side of the metal roofing material 1, that is, the region of the opening of the body portion 20 and the back substrate 3, has lower strength than that of the top plate 20a region of the body portion 20. The embedment of the plate reinforcing member(s) 5 in the core material 4 at the position close to the back substrate 3 allows the back side of the metal roofing material 1 to be reinforced by the plate reinforcing member(s) 5, so that the wind pressure resistance performance of the metal roofing material 1 can be improved. The wind pressure resistance performance refers to performance resistant to a load for uplifting an eave-side end portion 1E of the metal roofing material 1. Such a load may be caused by wind blowing on the metal roofing material 1 tightened to the roof base.

Each plate reinforcing member 5 may be in the form of a flat sheet as shown in FIG. 4(a), or it may be in the form of a sheet including an uneven portion 5a as shown in FIG. 4(b). When the plate reinforcing member 5 is formed from the sheet including the uneven portion 5a, the plate reinforcing member 5 is arranged such that an extending direction 5b of the uneven portion 5a is along the eave-ridge direction 6. The arrangement of the plate reinforcing member 5 including the uneven portion 5a in such an orientation can allow more reliable improvement of the wind pressure resistance performance.

The materials of the plate reinforcing members 5 that can be used include metals or fiber reinforced plastics. Examples of the metal materials that can be used include plated steel sheets, stainless steel sheets and coated steel sheets. Examples of the fiber reinforced plastics that can be used include resins with glass fibers or carbon fibers dispersed therein. Preferable examples of the resins that can be used include resins having a grade V-0 or higher according to the UL 94 standard which is a certification standard of frame retardancy of resins (for example, polyvinylidene fluoride, silicones, Teflon®, crosslinked polyethylene, and the like). When the metal roofing material 1 is cut to adjust the size of the metal roofing material 1, any prevention of the cutting of the metal roofing material 1 by the plate reinforcing member 5 can be avoided by using the resin material.

In the embodiments shown in FIGS. 1 to 3, the plate reinforcing member 5 is configured such that it extends over the entire region of the opening of the body portion 20 in the eave-ridge direction 6 and in the eave direction 7 when the metal roofing material 1 is placed upon the roof base. The phrase "the plate reinforcing member 5 extends over the entire region of the opening of the body portion 20 in the eave-ridge direction 6 and in the eave direction 7" means that the extending width of the plate reinforcing member 5 in the eave-ridge direction 6 is 90% or more of the extending width of the opening of the body portion 20 in the same direction, and the extending width of the plate reinforcing member 5 in the eave direction 7 is 90% or more of the extending width of the opening of the body portion 20 in the same direction. The extension of the plate reinforcing member 5 over the entire region of the opening of the body portion 20 in the eave-ridge direction 6 and in the eave direction 7 allows more reliable improvement of the wind pressure resistance performance of the metal roofing material 1.

The plate reinforcing member 5 may be embedded in the core material 4 at a position apart from the back substrate 3. However, the plate reinforcing member is preferably embedded in the core material 4 at a position that is in contact with the back substrate 3, as shown in FIG. 3. By arranging the plate reinforcing member 5 in contact with the back substrate 3, the strength of the back surface of the metal roofing material 1 can be improved at positions that will be brought into contact with corner portions of other metal roofing material 1 when the metal roofing material 1 is overlapped with the other metal roofing material 1. This can prevent crushing of the back surface of the metal roofing metal 1 due to contact with the corner portions of the other metal roofing material 1. If the crushing is generated on the back surface of the metal roofing material 1, any folding originating from the crushing may be generated in the metal roofing material 1 when large force is applied to the metal roofing material 1 by strong wind or the like, for example. Therefore, the arrangement of the plate reinforcing member 5 at the positions that will be brought in contact with the back substrate 3 to reinforce the back surface of the metal roofing material 1 by the plate reinforcing member 5 will contribute to improvement of the wind pressure resistance performance of the metal roofing material 1. The plate reinforcing member 5 is configured to be harder than the foamed resin making up the core material 4, in terms of avoiding the generation of such crushing. It should be note that the embedment of the plate reinforcing member 5 in the core material 4 allows more reliable integration of the plate reinforcing member 5 with the metal roofing material 1, as well as it can prevent the plate reinforcing member 5 from being exposed to the outside. Further, it can prevent irregularities or voids from being formed on the back surface side of the metal roofing material 1 by the plate reinforcing member 5, and can avoid deterioration of the wind pressure resistance performance of the metal roofing material 1.

<Regarding Roofing Method>

Next, FIG. 5 is an explanatory view showing a roofing method using the metal roofing material 1 of FIG. 1, and FIG. 6 is a side view showing two metal roofing materials that overlap with each other in FIG. 5. As shown in FIG. 5, when the roofing is carried out using the metal roofing material 1 shown in FIG. 1 (when constructing a roof), the metal roofing materials 1 are disposed side by side on the roof base while butting side edges of each other, in the eave direction 7 parallel to the eave of the building. In this case, each metal roofing material 1 is arranged on the roof base such that the longitudinal direction 1L is along the eave direction 7 and the short direction 1S is along the eave-ridge direction 6 of the roof. After arranging the metal roofing materials 1 on the roof base, the tightening members 8 such as screws or nails are driven into the metal roofing material 1, and the tightening members 8 are fixed to the roof base. In this case, the tightening members 8 pass through the tightening holes 21 and also penetrate the plate reinforcing member 5 to reach the roof base.

Further, each metal roofing material 1 is arranged on the roof base while stacking an eave-side end portion 1E of the metal roofing material 1 (11) on the ridge side (the upper side in FIG. 6) onto a ridge-side end portion 1U of the metal roofing material 1 (10) on the eave side (the lower side in FIG. 6). In this case, the metal roofing material 1 on the ridge side is arranged such that the plate reinforcing member 5 disposed in contact with the back substrate 3 overlaps with a ridge-side corner portion 10a of the metal roofing material 10 on the eave side. As a result, even if the ridge-side corner portion 10a is excessively pressed against the back surface of the metal roofing material 11 on the ridge side, crushing will be less liable to occur on the back surface of the metal roofing material 11 on the ridge side.

<Regarding First Variation>

Next, FIG. 7 is an explanatory view showing a first variation of the metal roofing material 1 of FIG. 1. The first variation shown in FIG. 7 is different from the embodiment of FIG. 1 in that the plate reinforcing member 5 is disposed in contact with the outer surface of the back substrate 3. In such an embodiment, the plate reinforcing member 5 can also reinforce the metal roofing material 1 on the back side of the metal roofing material 1. Other configurations are the same as those of the embodiment of FIG. 1.

<Regarding Second Variation>

Next, FIG. 8 is an explanatory view showing a second variation of the metal roofing material 1 of FIG. 1. The second variation shown in FIG. 8 is different from the embodiment of FIG. 1 in that the plate reinforcing member 5 does not extend over the entire opening of the body portion 20 in the eave-ridge direction 6. As shown in FIG. 8, the plate reinforcing member 5 continuously extending in the eave direction 7 may extend from a position where the tightening members are driven into the metal roofing material 1 to the eave-side end portion 1E of the metal roofing material 1. When the metal roofing material 1 is tightened to the roof base, the load for uplifting the eave-side end portion 1E of the metal roofing material 1 is forced to warp the metal roofing material in the region from the tightened portion of the metal roofing material 1 to the eave-side end portion 1E. The extension of the plate reinforcing member 5 from the position where the tightening members are driven into the metal roofing material 1 to the eave-side end portion 1E of the metal roofing material 1 allows more reliable improvement of the wind pressure resistance performance while avoiding an increase in the weight of the metal roofing material 1.

Here, the plate reinforcing member 5 extends to a position where the tightening members 8 are driven into the metal roofing material 1. In other words, the plate reinforcing member 5 is disposed so as to overlap with the tightening holes 21 (which are at positions where the tightening members 8 are driven) as viewed in the plane. The tightening members 8 penetrate both of the rigid two members (the front substrate 2 and the plate reinforcing member 5) which are separated from each other in the thickness direction of the metal roofing material 1, thereby preventing the swing of the tightening members 8 and preventing the tightening members 8 from being coming out from the metal roofing material 1. However, the plate reinforcing member 5 may not necessarily extend to the driven positions of the tightening members 8, and it may extend to a position sifted from the tightening holes 21. Other configurations are the same as those of the embodiment shown in FIG. 1.

<Regarding Third Variation>

Next, FIG. 9 is an explanatory view showing a third variation of the metal roofing material 1 of FIG. 1, and FIG. 10 is a cross-sectional view of the metal roofing material 1 around the burring hole of FIG. 9. The third variation shown in FIGS. 9 and 10 is different from the embodiment of FIG. 1 in that the plate reinforcing member 5 does not extend over the entire opening of the body portion 20 in both of the eave-ridge direction 6 and the eave direction 7. In other words, the plate reinforcing member 5 may have a smaller size in the eave-ridge direction 6 and in the eave direction 7 than that of the second variation. As shown in FIG. 9, the plate reinforcing member 5 may extend only around the positions where the tightening members are driven into the metal roofing material 1. Since the reinforcing member 5 continuously extends in the width direction of the metal roofing material 1, a wider region on the back surface of the metal roofing material 1 is reinforced by one plate reinforcing member 5. Therefore, the production steps are simplified as compared with an embodiment (a fourth variation as described below) in which a plurality of plate reinforcing members are arranged so as to be spaced in the width direction. Even in such an embodiment, it is possible to prevent the crushing being generated on the back surface of the metal roofing material 1 by contacting with the corner portions of other metal roofing material 1.

The third variation shown in FIGS. 9 and 10 is also different from the embodiment of FIG. 1 in that the plate reinforcing member 5 is provided with a plurality of burring holes 50. Each burring hole 50 can be formed by subjecting the plate reinforcing member 5 to burring processing. As shown in FIG. 10, each burring hole 50 has a hole opening 50a and a vertical wall portion 50b standing from the edge of the hole opening 50a. The vertical wall portion 50b may be configured by a series of wall bodies along the edge of the hole opening 50a or may be configured by a plurality of wall bodies separated from each other along the edge of the hole opening 50a. The providing of the plate reinforcing member 5 with such burring holes 50 leads to increased bending rigidity of the plate reinforcing member 5 and the metal roofing material 1.

Each of the burring holes 50 is spaced apart from each other in the longitudinal direction and in the short direction of the plate reinforcing member 5. More particularly, the burring holes 50 are disposed at the end portions (four corners), at the center and near the center of the plate reinforcing member 5 along the longitudinal direction and the short direction. The hole openings 50a of the two burring holes 50 arranged near the center are superposed on the positions where the tightening members 8 are driven into the metal roofing material 1 (on the tightening holes 21). Therefore, the tightening members 8 can easily pass through the plate reinforcing member 5, and burdens on the operator can be reduced. If the tightening members 8 are driven into the metal roofing material 1 in a manner different from that of the embodiment, the hole opening(s) 50a of one or three or more burring holes 50 may be superposed on the position(s) where the tightening member(s) 8 is/are driven into the metal roofing material 1.

The vertical wall portion 50b of each burring hole 50 is in contact with the back surface of the front substrate 2. This can lead to increased compressive strength of the metal roofing material 1 and improved snow resistance, as well as this can allow suppression of deformation of the front substrate 2 when ices are fallen or solar panels are mounted. Other configurations are the same as those of the embodiment shown in FIG. 1.

<Regarding Fourth Variation>

Next, FIG. 11 is an explanatory view showing a fourth variation of the metal roofing material 1 of FIG. 1. The fourth variation shown in FIG. 11 is different from the embodiment of FIG. 1 in that a plurality of plate reinforcing members 5 are arranged so as to be spaced apart from one another in the longitudinal direction 1L (width direction) of the metal roofing material 1. Each plate reinforcing member 5 extends such that its longitudinal direction is along the eave-ridge direction 6 (the short direction 1S of the metal roofing material 1). By thus arranging the plate reinforcing members 5 so as to be spaced apart from one another in the width direction, an increase in the weight of the metal roofing material 1 can be reduced while maintaining the required proof stress.

The variation shown in FIG. 11 is also different from the embodiment of FIG. 1 in that each plate reinforcing member 5 is provided with a plurality of burring holes 50. The respective burring holes 50 are arranged so as to be spaced apart from one another in the longitudinal direction of each plate reinforcing member 5. More particularly, the burring holes 50 are disposed at both ends and the center of each plate reinforcing member 5. The hole opening 50a of the burring hole 50 disposed at the center is superposed on the position where the tightening member 8 is driven into the metal roofing material 1 (on the tightening hole 21). The specific embodiment of each burring hole 50 is the same as that of the third variation (FIG. 10). Other configurations are the same as those of the embodiment shown FIG. 1.

<Regarding Fifth Variation>

As the fifth variation, the back substrate 3 may be made of the same metal sheet as the front substrate 2 without using the plate reinforcing member 5, although not shown in any figure.

Various combinations of the different points of the first to fifth variations from the embodiment of FIG. 1 may be implemented. For example, the burr holes 50 may be applied to the second variation.

<Regarding Strength Test Equipment>

Next, FIG. 12 is a perspective view showing strength test equipment 9 for carrying out a strength test of the metal roofing material 1 of FIG. 1, and FIG. 13 is an explanatory view showing an uplifted state of the eave-side end portion 1E of the metal roofing material 1 of FIG. 5. As shown in FIG. 12, the strength test equipment 9 includes a base 90, a frame body 91, a load applying device 92, a connection member 93, a load meter 94, and a displacement meter 95.

The base 90 is a member onto which the metal roofing material 1 subjected to the strength test is placed and tightened. The base 90 simulates an actual roof base to which the metal roofing material 1 is tightened, and can be formed from, for example, a wooden plate or the like. The tightening of the metal roofing material 1 to the base 90 is preferably carried out in accordance with the actual tightening of the metal roofing material 1 to the roof base. That is, the metal roofing material 1 is preferably tightened to the base 90 by driving the tightening members 8 into the body portion 20 of the metal roofing material 1 at predetermined positions, in accordance with the method of actually tightening the metal roofing material 1 to the roof base, as shown in FIGS. 5 and 6.

The frame body 91 is a member attached to the eave-side end portion 1E of the metal roofing material 1. The frame body 91 includes a longitudinal base body 910 and a cover body 911 that extend in the longitudinal direction 1L of the metal roofing material 1. Although not shown, at least one of the base body 910 and the cover body 911 is provided with a concave portion compatible with the outer shape of the eave-side end portion 1E of the metal roofing material 1, and the base body 910 and the cover body 911 are connected to each other while fitting the eave-side end portion 1E into the concave portion. That is, the eave-side end portion 1E of the metal roofing material 1 is sandwiched between the base body 910 and the cover body 911, whereby the frame body 91 is attached to the eave-side end portion 1E of the metal roofing material 1.

The extending width of the frame body 91 in the longitudinal direction 1L (width direction) of the metal roofing material 1 is wider than the extending width of the eave-side end portion 1E of the metal roofing material 1 in the longitudinal direction 1L of the metal roofing material 1, and the frame body 91 is integrated with the entire eave-side end 1E of the metal roofing material 1 in the width direction. Thus, when a load is applied to the eave-side end portion 1E of the metal roofing material 1 through the frame body 91, the load is equally applied to the entire eave-side end portion 1E of the metal roofing material 1.

The load applying device 92 is connected to the eave-side end portion 1E of the metal roofing material 1 through the frame body 91, and applies a load 92L for uplifting the eave-side end portion 1E of the metal roofing material 1 to the eave-side end portion 1E. The load applying device 92 that can be used includes, for example, actuators such as press machines. In the strength test equipment 9 according to the embodiment, the load applying device 92 is placed above the frame body 91, connected to the frame body 91 via the connection member 93 such as a wire, and configured to lift up the eave-side end portion 1E via the connection member 93 and the frame body 91. However, the load applying device 92 may be placed below the frame body 91 and configured to lift up the eave-side end portion 1E via the frame body 91.

The load meter 94 is a sensor which is interposed between the frame body 91 and the load applying device 92 and which measures the load 92L applied from the load applying device 92 to the eave-side end portion 1E of the metal roofing material 1. In the embodiment, the load meter 94 is fixed to the lower portion of the load applying device 92. The connection member 93 is connected to the load meter 94.

The displacement meter 95 is a sensor for measuring an uplift amount 1R of the eave-side end portion 1E when the load 92L is applied from the load applying device 92 to the eave-side end portion 1E of the metal roofing material 1. In the embodiment, the displacement meter 95 is constituted by a laser displacement meter supported by a support (not shown) so as to be positioned above the frame body 91. However, as the displacement meter 95, any other sensor may be used, such as, for example, a sensor which is disposed in contact with the frame body 91 or the end portion 1E and mechanically measures the uplift amount of the end portion 1E.

Here, for the metal roofing material 1 tightened to the roof base, when the wind blows against the metal roofing material 1, the load for uplifting the eave-side end portion 1E of the metal roofing material 1 is applied to the metal roofing material 1. The load 92L of the load applying device 92 simulates such a load of wind.

When the eave-side end portion 1E of the metal roofing material 1 is uplifted by a certain amount due to excessive strong wind, the wind enters a gap between the eave-side end portion 1E of the metal roofing material 1 and the roof base. The wind thus entering the gap will act on a wide region of the back surface of the metal roofing material 1 and rapidly break the metal roofing material 1. That is, the strength of the metal roofing material 1 significantly correlates with the difficulty in uplifting the eave-side end 1E of the metal roofing material 1. By measuring the load 92L and the uplift amount 1R with the load meter 94 and the displacement meter 95, the difficulty in uplifting the eave-side end 1E of the metal roofing material 1, that is, the strength of the metal roofing material 1, can be evaluated.

<Regarding Uplift Coefficient>

Next, FIG. 14 is a graph showing an example of the uplift amount 1R of the end portion 1E versus the load 92L measured by the strength test equipment 9 of FIG. 13. When the load 92L for uplifting the eave-side end portion 1E is applied to the eave-side end portion 1E of the metal roofing material 1, the metal roofing material 1 undergoes elastic deformation until the load 92L reaches a predetermined value. As shown in FIG. 14, while the metal roofing material 1 undergoes elastic deformation, the uplift amount 1R substantially linearly increases with an increase in the load 92L.

The inclination of the linearly increasing region of the uplift amount 1R, that is, an amount of change of the load 92L relative to an amount of change of the measured uplift amount 1R is an index representing the difficulty in uplifting the end portion 1E of the metal roofing material 1. Hereinafter, the amount of change of the load 92L relative to the amount of change of the uplift amount 1R is referred to as an uplift coefficient [N/mm]. By determining such an uplift coefficient, the strength of the metal roofing material 1 can be more reliably evaluated. In the example of FIG. 14, the uplift coefficient is 2.7 [N/mm].

<Regarding Relationship Between Uplift Coefficient and Strength of Metal Roofing Material>

Next, FIG. 15 is a graph showing a relationship between the uplift coefficient of FIG. 14 and a wind speed of wind blowing on the metal roofing material 1, FIG. 16 is an explanatory view showing tightening positions of the metal roofing material 1 experimentally produced when testing the relationship of FIG. 15, and FIG. 17 is an explanatory view showing modes of the reinforcing members 5 for the metal roofing material 1 experimentally produced when testing the relationship of FIG. 15. It should be noted that in FIG. 16, a reference symbol TP denotes the tightening position. FIG. 16 shows that the metal roofing material 1 is tightened at four positions. The present inventors experimentally produced metal roofing materials from No. 1 to No. 35 as shown in Table 1 below, conducted a blowing test using them as samples to be tested and investigated the relationship between the uplift coefficient and the wind speed at breakage.

In the blowing test, 15 samples (metal roofing materials 1) each having a width of 908 mm×a depth of 414 mm were placed upon a base material having a width of 2000 mm×a depth of 1184 mm arranged with a gradient of about 26.6° to construct a simulated roof. The samples were arranged on the simulated roof as shown in FIG. 5. More particularly, two or three samples were arranged in the eave direction 7 to form a sample row, and the sample row is stacked in the eave direction 6 to arrange six sample rows. In the eave-ridge direction 6, the sample on the ridge side was overlapped on the sample on the eave side such that 154 mm of the sample on the eave side protrudes from the sample on the ridge side. In the eave direction 7, a protruding portion from the base material of the sample was cut out. Then, a blower nozzle was installed in front of the simulated roof, and wind was blown from the blowing nozzle to the simulated roof. The blower nozzle was placed at a position of 1 m ahead the center of the simulated roof and the height at the center of the blower nozzle was allowed to coincide with the height at the center of the simulated roof. In addition, the material of the front substrate 2 of the sample is a coated hot-dip Zn—Al alloy plated steel sheet having 0.30 mm, and the material of the core material 4 was the urethane foam. The wind speed at breakage refers to a wind speed at which the metal roofing material 1 is broken when the wind is blown from the air blowing nozzle to the metal roofing material 1. In FIG. 15, breakage of the metal roofing material 1 is represented by "x" and non-breakage of the metal roofing material 1 is represented by "○".

TABLE 1

| No. | Plate Thickness of Material | Thickness of Core Material | Amount of Core Material | Number of N | Reinforcing Plate | Tightening Position | Back Material | Wind Speed of Blowing Test (m/s) 20 | 30 | 40 | 50 | Uplift Coefficient [N/mm] |
|---|---|---|---|---|---|---|---|---|---|---|---|---|
| 1 | 0.3 | 5 | 148 | 1 | Non | 234 | PE | ○ | ○ | x | x | 1.81 |
| 2 | | | | 2 | | | | ○ | ○ | x | x | 1.93 |
| 3 | | | | 3 | | | | ○ | ○ | x | x | 1.80 |
| 4 | | 5 | 148 | 1 | Non | 224 | PET | ○ | ○ | x | x | 2.13 |
| 5 | | | | 2 | | | | ○ | ○ | x | x | 2.20 |
| 6 | | | | 3 | | | | ○ | ○ | x | x | 2.17 |
| 7 | | 4 | 140 | 1 | Non | 234 | PE | ○ | x | x | x | 1.57 |
| 8 | | | | 2 | | | | ○ | x | x | x | 1.61 |
| 9 | | | | 3 | | | | ○ | x | x | x | 1.62 |
| 10 | | 4 | 140 | 1 | Non | 234 | PE | ○ | x | x | x | 1.05 |
| 11 | | | | 2 | | | | ○ | x | x | x | 1.17 |
| 12 | | | | 3 | | | | ○ | x | x | x | 1.13 |
| 13 | | 5 | 148 | 1 | Lateral, 870 W × 70 L | 224 | PET | ○ | ○ | x | x | 3.50 |
| 14 | | | | 2 | | | | ○ | ○ | x | x | 3.98 |
| 15 | | | | 3 | | | | ○ | ○ | x | x | 4.14 |
| 16 | | 5 | 148 | 1 | Lateral, 870 W × 90 L | 224 | PET | ○ | ○ | x | x | 3.94 |
| 17 | | | | 2 | | | | ○ | ○ | x | x | 5.03 |
| 18 | | | | 3 | | | | ○ | ○ | x | x | 4.36 |
| 19 | | 5 | 148 | 1 | Lateral, 870 W × 110 L | 224 | PET | ○ | ○ | ○ | x | 4.04 |
| 20 | | | | 2 | | | | ○ | ○ | ○ | x | 5.59 |
| 21 | | | | 3 | | | | ○ | ○ | ○ | x | 4.49 |
| 22 | | 4 | 140 | 1 | Vertical Four Plates, | 234 | PE | ○ | ○ | ○ | x | 3.60 |
| 23 | | | | 2 | | | | ○ | ○ | ○ | x | 3.90 |
| 24 | | | | 3 | | | | ○ | ○ | ○ | x | 3.58 |
| 25 | | 5 | 148 | 1 | 30 W × 380 L | 224 | PET | ○ | ○ | ○ | ○ | 6.46 |
| 26 | | | | 2 | | | | ○ | ○ | ○ | ○ | 6.39 |
| 27 | | | | 3 | | | | ○ | ○ | ○ | ○ | 6.77 |
| 28 | | 5 | 148 | 1 | Vertical Four Plates, 30 W × 380 L | 224 | PET | ○ | ○ | ○ | ○ | 10.52 |
| 29 | | | | 2 | | | | ○ | ○ | ○ | ○ | 10.93 |
| 30 | | | | 3 | | | | ○ | ○ | ○ | ○ | 10.43 |
| 31 | | 5 | 148 | 1 | Entire Surface, 870 W × 375 L | 224 | PET | ○ | ○ | ○ | ○ | 30.86 |
| 32 | | | | 2 | | | | ○ | ○ | ○ | ○ | 33.90 |
| 33 | | | | 3 | | | | ○ | ○ | ○ | ○ | 34.36 |
| 34 | | 5 | 148 | 1 | Half Surface, 878 W × 245 L | 224 | PET | ○ | ○ | ○ | ○ | 20.79 |
| 35 | | | | 2 | | | | ○ | ○ | ○ | ○ | 22.56 |

○No Breakage,
xBreakage

As shown in FIG. 15, the metal roofing material 1 having an uplift coefficient of less than 6 N/mm could not withstand a wind of 50 m/s or less, so that it was broken. However, the metal roofing material 1 having an uplift coefficient of 6 N/mm or more was not broken even if a wind of 50 m/s was brown. Therefore, it was found that whether or not the metal roofing material 1 can withstand the wind of 50 m/s can be determined by determining whether or not the uplift coefficient of the metal roofing material 1 is 6 N/mm or more.

The uplift coefficient can be increased by carrying out at least one of increasing the thickness of the front substrate 2, increasing the density of the core material 4, changing the material of the core material 4 to that having higher strength, increasing the strength of the back substrate 3 (metallizing the back substrate and increasing the plate thickness), using the plate reinforcing member 5 and providing the plate reinforcing member 5 with the burring hole(s) 50.

When using the plate reinforcing member(s) 5 as in the embodiment of FIG. 1 as well as the first to fourth variations, the metal roofing material 1 can be configured to be able to withstand the wind of 50 m/s by providing the plate reinforcing member 5 such that the uplift coefficient is 6 N/mm or more, while taking into account conditions such as the limitation of the plate thickness of the front substrate 2. In the case where the back substrate 3 is a metal sheet as in the fifth variation, the metal roofing material 1 can be configured so as to be able to withstand the wind of 50 m/s by structuring the metal roofing material 1 such that the uplift coefficient is 6 N/mm or more, in view of conditions of the entire metal roofing material 1 including the back substrate 3.

Such a metal roofing material 1 can lead to improved wind pressure resistance, because at least one plate reinforcing member 5 is embedded in the core material 4 at the position closer to the back substrate 3 than the top plate 20*a* of the body portion 20 or arranged on the outer surface of the back substrate 3, or the back substrate 3 is made of the metal sheet. In particular, by setting the uplift coefficient to 6 N/mm or more, the metal roofing material 1 can be configured so as to be able to withstand the wind of 50 m/s.

Further, the plate reinforcing member 5 extends over the entire region of the opening of the body portion 20 in the eave-ridge direction 6 and in the eave direction 7, whereby the wind pressure resistance performance of the metal roofing material 1 can be more reliably improved.

Further, the plate reinforcing member 5 continuously extends in the eave direction 7 orthogonal to the eave-ridge direction 6 in a state where the plate reinforcing member 5 is in contact with the back substrate 3, so that the possibility where crashing is generated on the back surface to deteriorate the wind pressure resistance performance can be reduced. In particular, the production steps can be simplified as compared with an embodiment where the reinforcing members 5 are arranged so as to be spaced apart from one another in the width direction.

Furthermore, a plurality of plate reinforcing members 5 are disposed so as to be spaced apart from one another in the eave direction 7 in a state where the plate reinforcing members 5 are in contact with the back substrate 3, so that the possibility where crashing is generated on the back surface to deteriorate the wind pressure resistance performance can be reduced. In particular, the plate reinforcing members 5 are arranged so as to be spaced apart from one another in the width direction, whereby an increase in the weight of the metal roofing material 1 is suppressed while maintaining the required proof stress.

Further, the plate reinforcing member 5 extends from the position where the tightening members 8 are driven into the metal roofing material 1, to the eave-side end portion 1E of the metal roofing material 1 in the eave-ridge direction 6, whereby the wind pressure resistance performance of the metal roofing material 1 can be more reliably improved while avoiding the increase in the weight of the metal roofing material 1. In addition, it is also possible to prevent the shaking of the tightening members 8, and to prevent the tightening members 8 from easily coming out of the metal roofing material 1.

Furthermore, the plate reinforcing member 5 is embedded in the core material 4, whereby the plate reinforcing member 5 can be more reliably integrated with the back substrate 3 while preventing the plate reinforcing member 5 from being exposed to the outside. In addition, the forming of irregularities or voids on the back surface side of the metal roofing material 1 can be avoided by the plate reinforcing member(s) 5, so that it is possible to avoid deterioration of the wind pressure resistance performance of the metal roofing material 1.

Moreover, the plate reinforcing member 5 includes a plurality of burring holes 50 each having the hole opening 50*a* and the vertical wall portion 50*b* standing from the edge of the hole opening 50*a*, whereby the bending rigidity of the plate reinforcing member 5 can be increased. The bending rigidity of the entire metal roofing material 1 is also improved by increasing the bending rigidity of the plate reinforcing member 5.

Further, the hole opening 50*a* of at least one burring hole 50 is superposed on the position where the tightening member 8 is driven into the metal roofing material 1, whereby the tightening member 8 can easily pass through the plate reinforcing member 5 and burdens on the operator can be reduced.

Furthermore, the vertical wall portion 50*b* is in contact with the back surface of the front substrate 2, whereby the compressive strength of the metal roofing material 1 can be increased and the snow resistance can be improved, as well as any deformation of the front substrate 2 can be suppressed when ices are fallen or solar panels are mounted.

Moreover, the plate reinforcing member 5 is made of a metal or a fiber reinforced plastic, whereby the wind pressure resistance performance of the metal roofing material 1 can be more reliably improved.

In addition, the plate reinforcing member 5 is the flat sheet or the sheet body having the uneven portion 5*a*, whereby the wind pressure resistance performance of the metal roofing material 1 can be more reliably improved while suppressing an increase in costs. In particular, the wind pressure resistance performance of the metal roofing material 1 can be further improved by using the sheet body having the uneven portion 5*a*.

Furthermore, the metal roofing material 1 (11) on the ridge side is arranged such that the plate reinforcing member 5 is overlaid on the corner portion 10*a* of the metal roofing material 1 (10) on the eave side in contact with the backing substrate 3, whereby it is possible to make it difficult for the back surface of the metal roofing material 11 on the ridge side to be crushed, even if the ridge-side corner portion 10*a* is excessively pressed against the back surface of the metal roofing material 11 on the ridge side.

What is claimed is:

1. A metal roofing material that is arranged on an eave-side metal roofing material in an eave-ridge direction of a roof so as to overlap with the eave-side metal roofing material, the metal roofing material being configured to be arranged so that a depth direction of the metal roofing material is along the eave-ridge direction of the roof and a width direction of the metal roofing material is along an eave direction of the roof, the metal roofing material comprising:

a front substrate made of a metal sheet and comprising a body portion formed in a box shape;

a back substrate arranged on the back side of the front substrate so as to cover an opening of the body portion;
a core material filled between the body portion and the back substrate; and
at least one plate reinforcing member that is embedded in the core material at a position closer to the back substrate than a top plate of the body portion or that is disposed in contact with the outer surface of the back substrate,
wherein the at least one plate reinforcing member includes a base portion extending along the depth direction and the width direction, a plurality of burring holes each comprising a hole opening and a vertical wall portion extending from the base portion in a height direction of the body portion and standing from an edge of the hole opening, the vertical wall portion being in contact with a back surface of the front substrate.

2. The metal roofing material according to claim 1, wherein the at least one plate reinforcing member extends over the entire region of the opening of the body portion in the eave-ridge direction and in the eave direction orthogonal to the eave-ridge direction.

3. The metal roofing material according to claim 1, wherein the at least one plate reinforcing member continuously extends in the eave direction orthogonal to the eave-ridge direction in a state where the at least one plate reinforcing member is in contact with the back substrate.

4. The metal roofing material according to claim 1, wherein a plurality of plate reinforcing members are disposed so as to be spaced apart from one another in the eave direction orthogonal to the eave-ridge direction in a state where the plurality of plate reinforcing members are in contact with the back substrate.

5. The metal roofing material according to claim 3, wherein the at least one plate reinforcing member extends from a position where at least one tightening member is driven into the metal roofing material to an eave-side end portion of the metal roofing material in the eave-ridge direction.

6. The metal roofing material according to claim 1, wherein the at least one plate reinforcing member is embedded in the core material.

7. The metal roofing material according to claim 1, wherein the hole opening of at least one burring hole is superposed on a position where a tightening member is driven into the metal roofing material.

8. The metal roofing material according to claim 1, wherein the at least one plate reinforcing member comprises a metal or a fiber reinforced plastic.

9. The metal roofing material according to claim 1, wherein the at least one plate reinforcing member comprises a flat sheet or a sheet body comprising an uneven portion.

10. The metal roofing material according to claim 1, wherein the metal roofing material is configured to have an uplift coefficient of 6 N/mm or more when carrying out a strength test method of the metal roofing material comprising the steps of: tightening the metal roofing material to a base; applying a load for uplifting an end portion of the metal roofing material tightened to the base to the end portion; measuring an uplift amount of the end portion, which corresponds to the load;
and determining an uplift coefficient represented by an amount of change of the load respective to an amount of change of the measured uplift amount.

11. A metal roofing material that is arranged on an eave-side metal roofing material in an eave-ridge direction of a roof so as to overlap with the eave-side metal roofing material, the metal roofing material being configured to be arranged so that a depth direction of the metal roofing material is along the eave-ridge direction of the roof and a width direction of the metal roofing material is along an eave direction of the roof, the metal roofing material comprising:
a front substrate made of a metal sheet and comprising a body portion formed in a box shape;
a back substrate made of a metal sheet and arranged on the back side of the front substrate so as to cover an opening of the body portion; and
a core material filled between the body portion and the back substrate
wherein the back substrate includes a base portion extending along the depth direction and the width direction, a plurality of burring holes each comprising a hole opening and a vertical wall portion extending from the base portion in a height direction of the body portion and standing from an edge of the hole opening, the vertical wall portion being in contact with a back surface of the front substrate, and
wherein the metal roofing material is configured to have an uplift coefficient of 6 N/mm or more when carrying out a strength test method of the metal roofing material comprising the steps of: tightening the metal roofing material to a base; applying a load for uplifting an end portion of the metal roofing material tightened to the base to the end portion; measuring an uplift amount of the end portion, which corresponds to the load; and determining an uplift coefficient represented by an amount of change of the load respective to an amount of change of the measured uplift amount.

12. A roofing method comprising arranging a ridge-side metal roofing material on an eave-side metal roofing material in an eave-ridge direction of a roof so as to overlap with the eave-side metal roofing material,
wherein the ridge-side metal roofing material comprises the metal roofing material according to claim 1 in which the at least one plate reinforcing member is arranged in contact with the back substrate; and
wherein the roofing method comprises arranging the ridge-side metal roofing material such that the at least one plate reinforcing member overlaps on a corner portion of the eave-side metal roofing member.

13. The metal roofing material according to claim 4, wherein each of the plurality of plate reinforcing members extends from a position where at least one tightening member is driven into the metal roofing material to an eave-side end portion of the metal roofing material in the eave-ridge direction.

* * * * *